United States Patent [19]

Szpitalak

[11] 3,822,639
[45] July 9, 1974

[54] APPARATUS FOR PREVENTING PRINTING OF AN EMPTY MANDREL

[75] Inventor: Wesley J. Szpitalak, Palos Park, Ill.

[73] Assignee: Continental Can Company, Inc., New York, N.Y.

[22] Filed: Sept. 24, 1973

[21] Appl. No.: 399,830

Related U.S. Application Data

[62] Division of Ser. No. 242,110, April 7, 1972, which is a division of Ser. No. 501,372, Oct. 22, 1965, Pat. No. 3,683,799.

[52] U.S. Cl. ............. 101/40, 101/247, 118/1, 118/230, 118/233, 118/239
[51] Int. Cl. ............................................. B41f 17/22
[58] Field of Search ........................... 101/38–40, 101/247; 118/1, 230, 232, 233, 239

[56] References Cited
UNITED STATES PATENTS

| | | | |
|---|---|---|---|
| 2,821,157 | 1/1958 | Boyd | 118/1 |
| 2,821,158 | 1/1958 | Brown et al. | 118/230 X |
| 3,133,496 | 5/1964 | Dubuit | 101/40 |
| 3,195,451 | 7/1965 | Hovekamp et al. | 101/38 R |
| 3,310,029 | 3/1967 | Ivanoff et al. | 118/230 |

Primary Examiner—Robert E. Pulfrey
Assistant Examiner—Clifford D. Crowder
Attorney, Agent, or Firm—Diller, Brown, Ramik & Wight

[57] ABSTRACT

An automatic coating and printing machine wherein can bodies and like tubular members are automatically positioned on mandrels and thereafter serially presented to coating and printing blankets wherein the necessary coating and printing is effected thereon with the mandrels being rotated as the can bodies carried thereby contact the blankets of the coating and printing cylinders to transfer coating and printing materials to the can bodies. Thereafter, the appropriately coated and printed can bodies are automatically transferred from the mandrels to another conveyor. The mandrels are so mounted wherein when no can body is on a mandrel, the mandrel does not come into contact with the printing or coating blankets.

3 Claims, 25 Drawing Figures

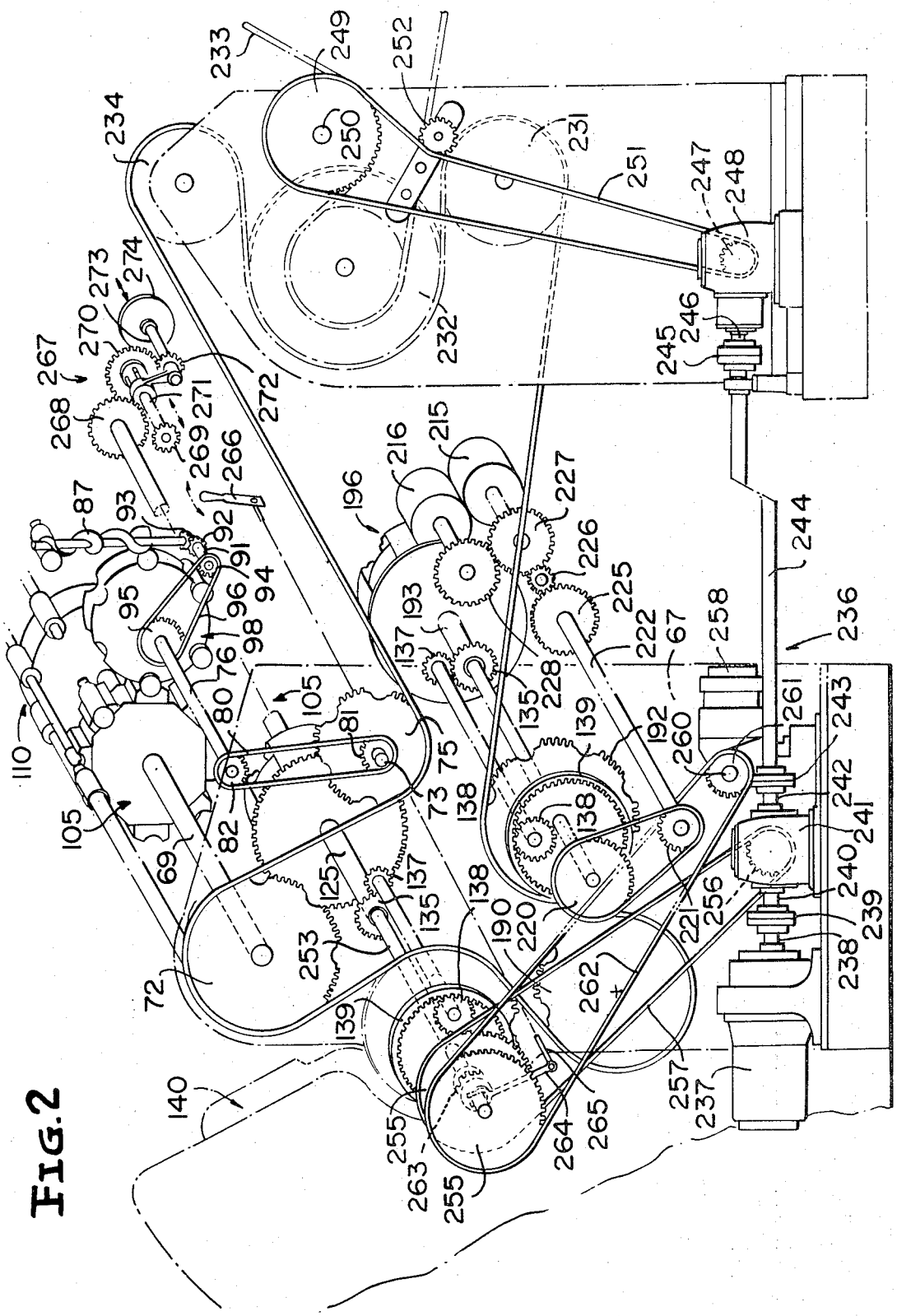

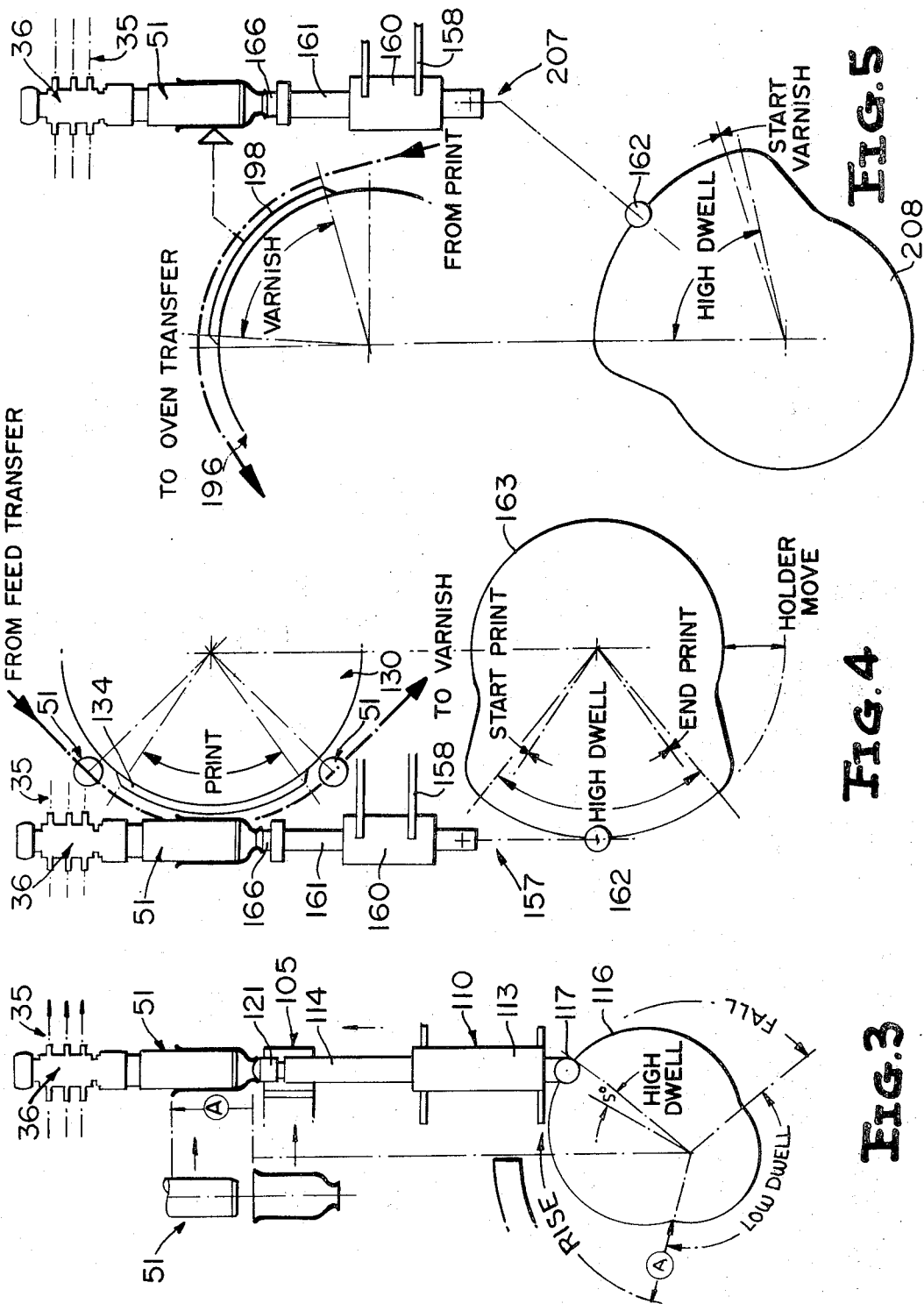

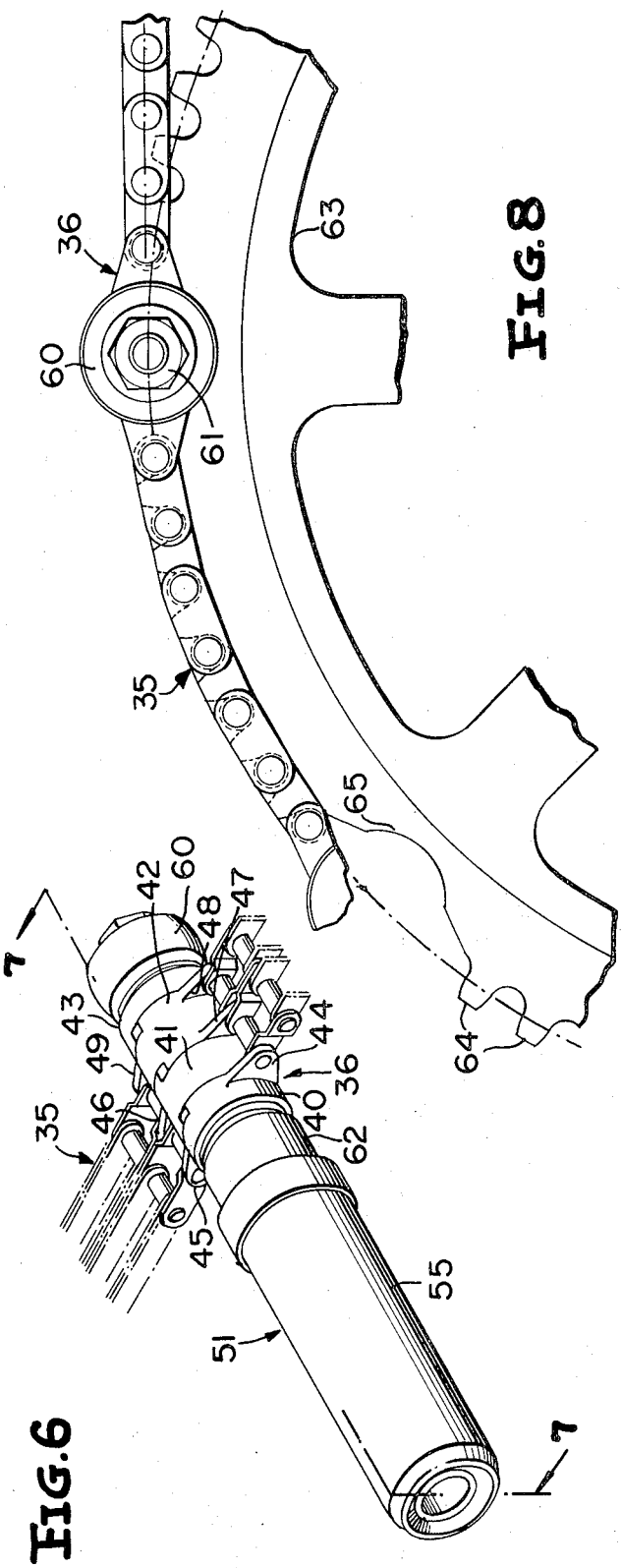
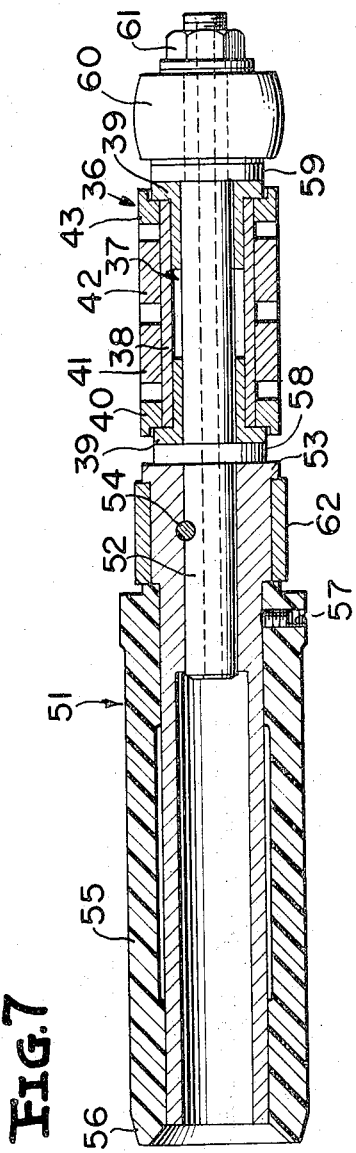
Fig.6  Fig.7  Fig.8

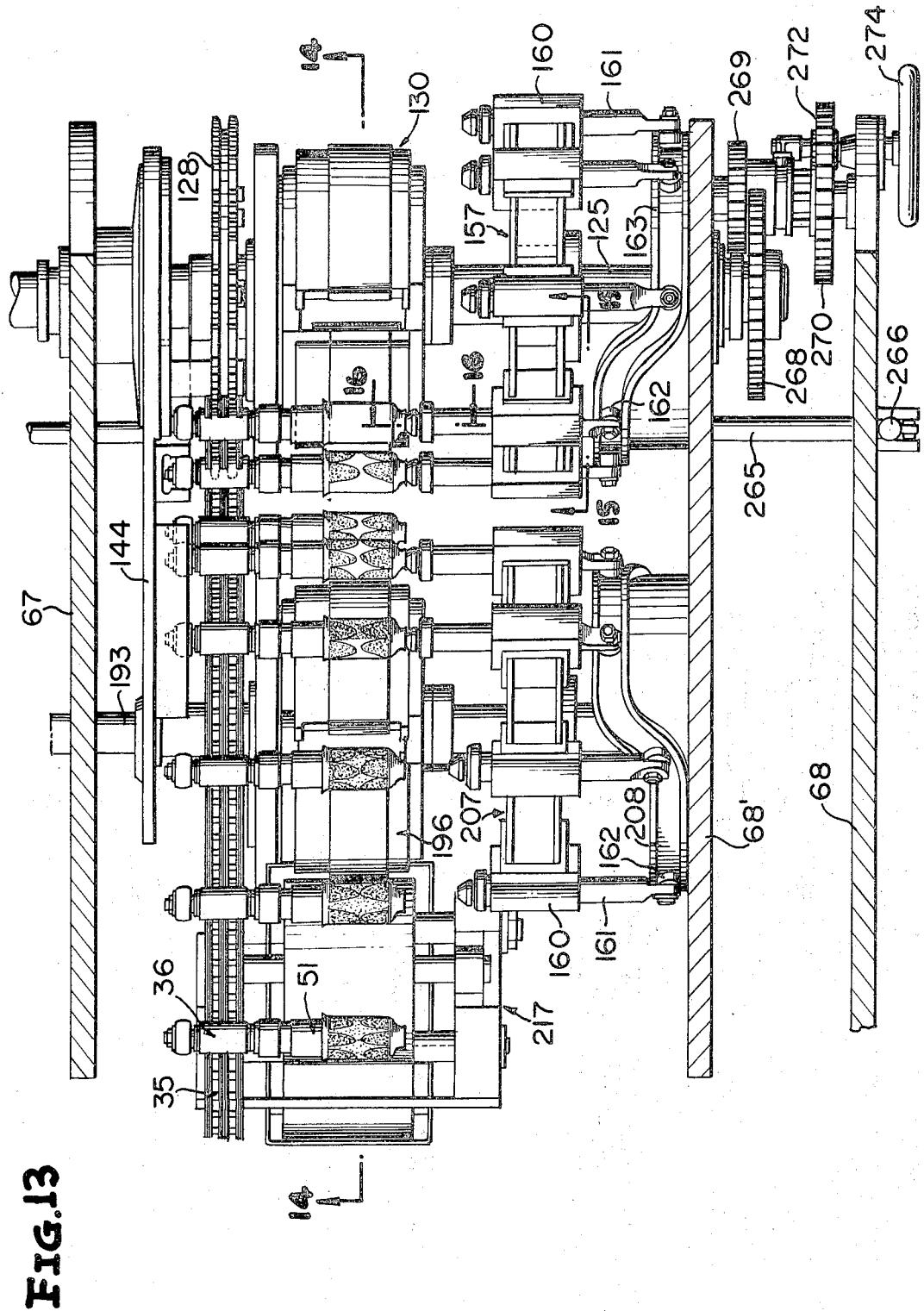

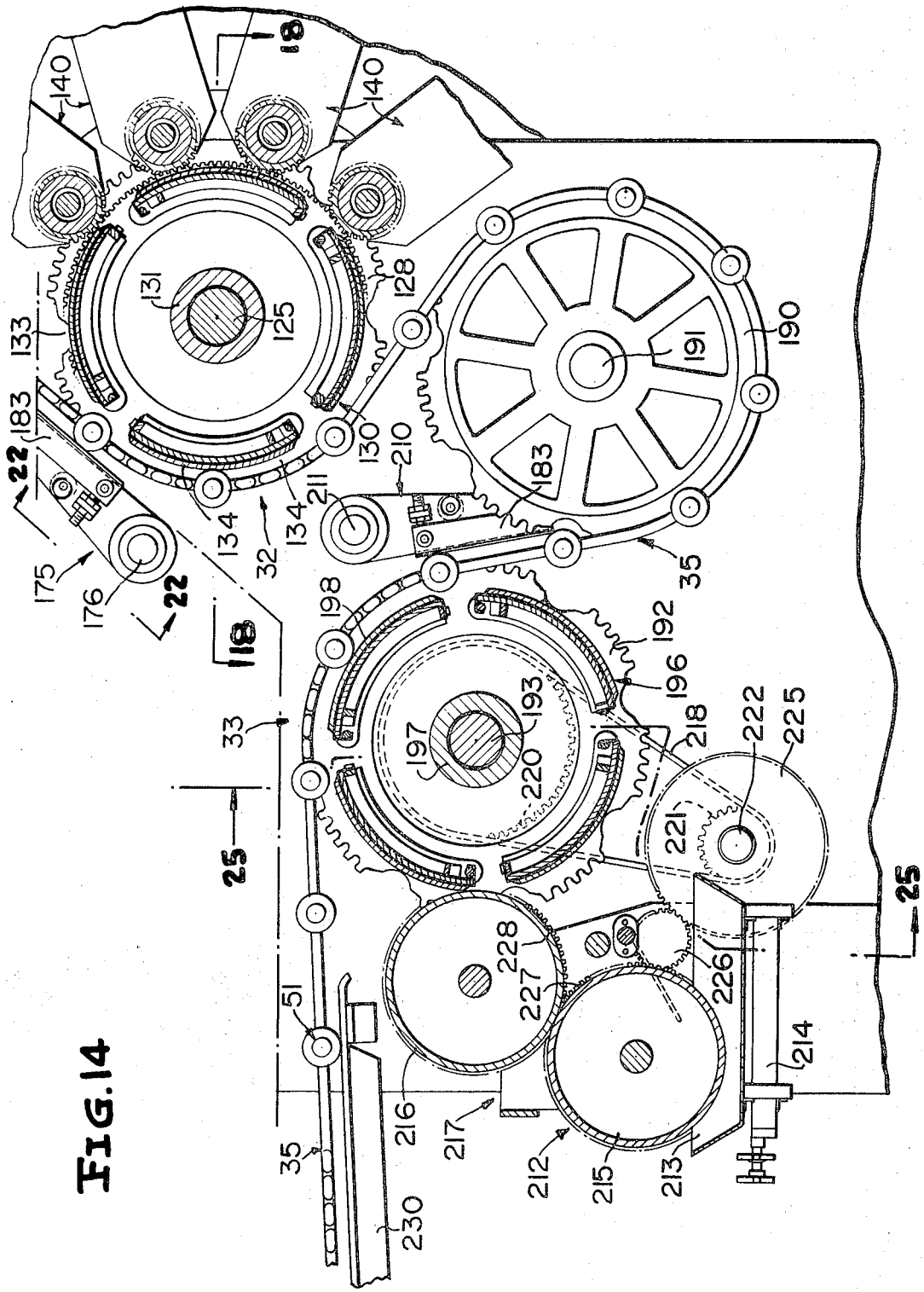

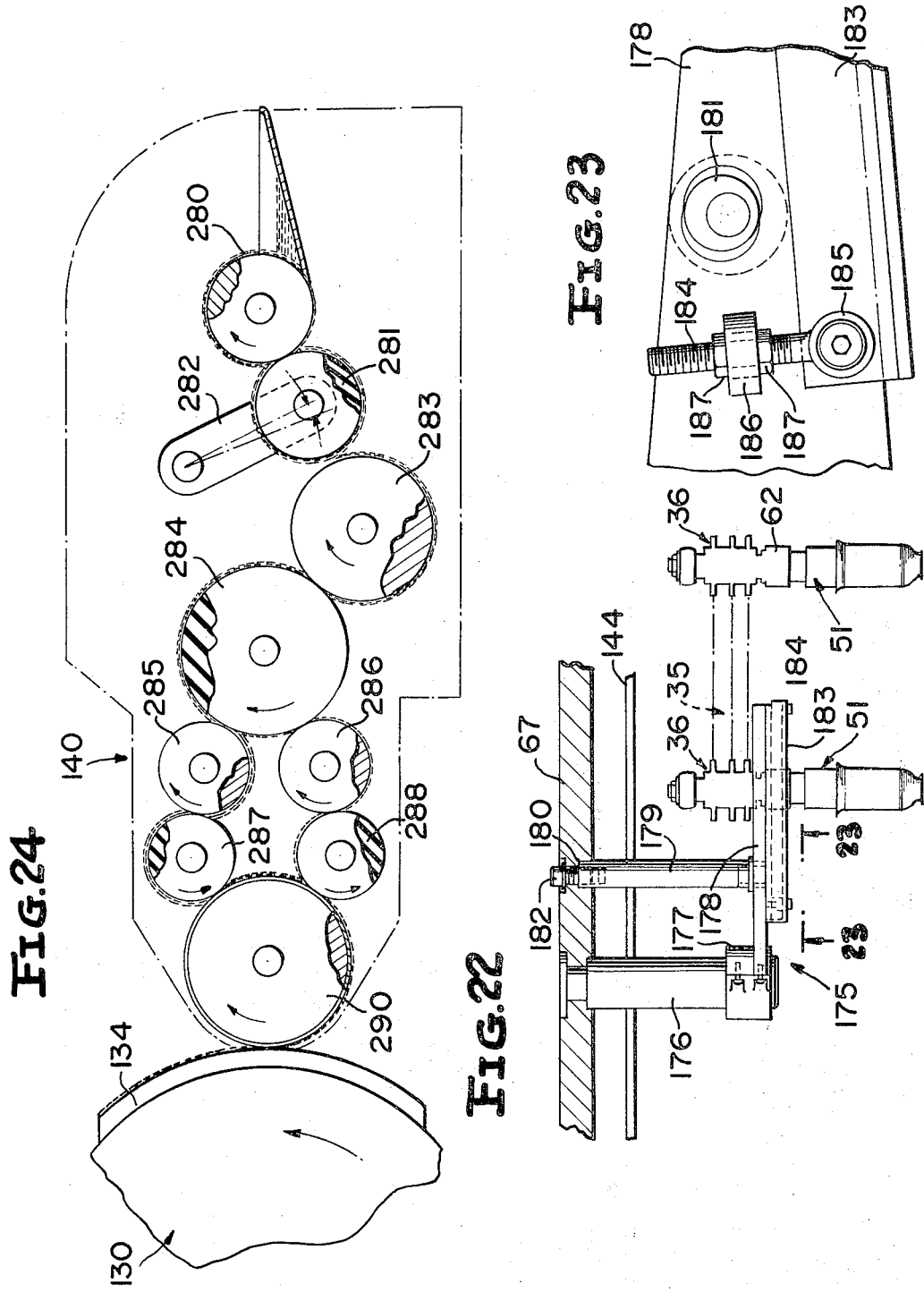

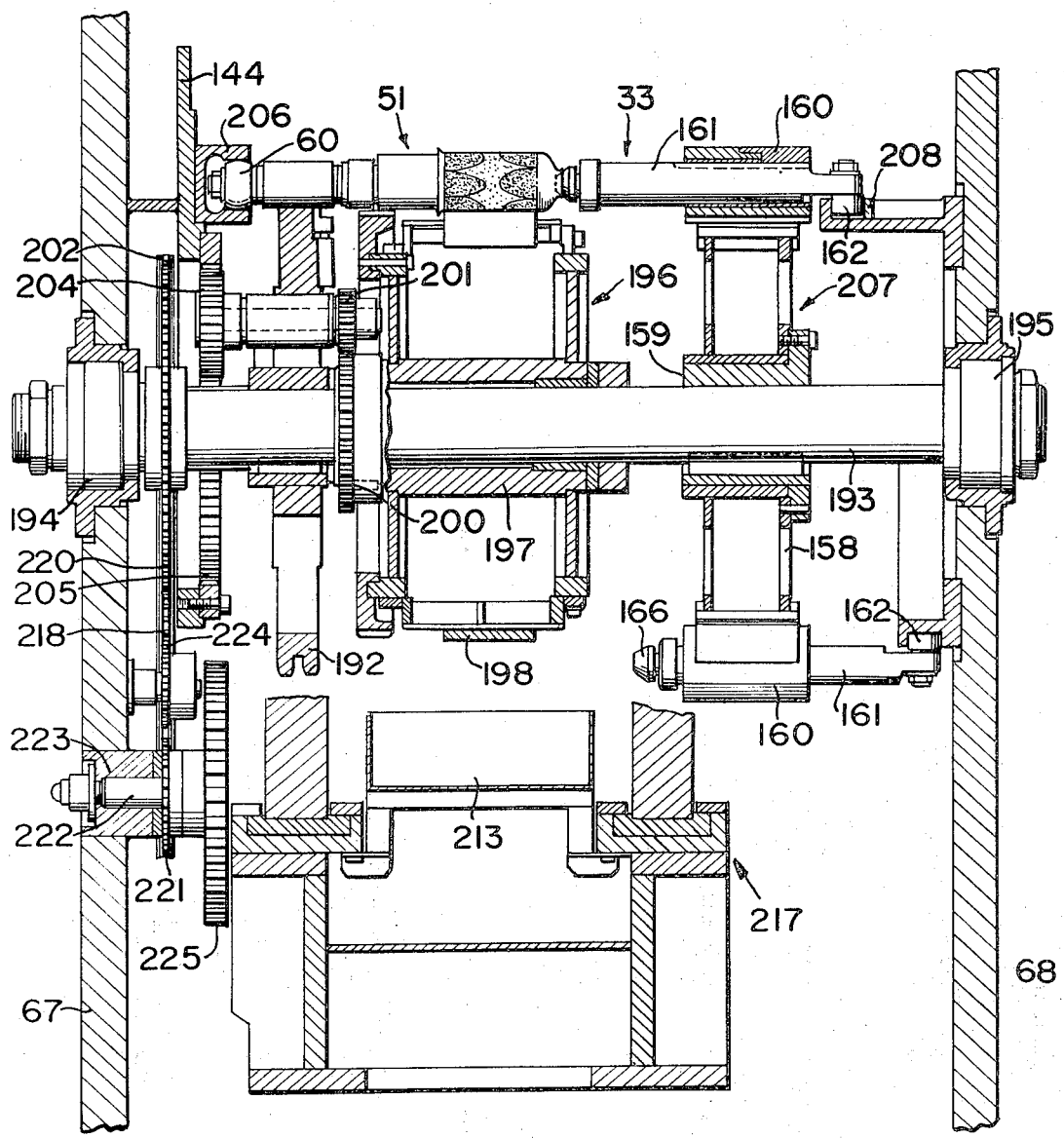

APPARATUS FOR PREVENTING PRINTING OF AN EMPTY MANDREL

This is a division of Ser. No. 242,110, filed Apr. 7, 1972, which is a division of Ser. No. 501,372, filed Oct. 22, 1965, now U.S. Pat. No. 3,683,799.

This invention relates in general to new and useful improvements in printing machines, and more specifically to a novel printing machine which is particularly adapted for the high speed printing of can bodies.

Can bodies are principally formed from a flat blank which is shaped into cylindrical form and then secured together by means of a longitudinal seam. When it is desired to have the decoration directly applied to the exterior surface of such can bodies, the flat blanks can be printed in any conventional manner. However, recently there has been an increase in the demand for can bodies which are not formed from flat blanks and therefore cannot be printed or decorated in advance. There has been developed printing presses for printing on these can bodies after the formation thereof. However, these printing presses or machines which have been developed in the past are too slow. A customary type of printing machine is one having a plurality of mandrels carried by a turret with each mandrel being indexed sequentially into position relative to a printing drum and while the mandrel is in its indexed position, the can body carried thereby is presented to the printing drum. The cost of printing can bodies with this type of equipment is prohibitly expensive.

In view of the foregoing, it is the principal object of this invention to provide a novel high speed can printing machine which is capable of continuously printing can bodies and with the capacity of the machine being many times that of prior machines whereby the utilization of the machine is economically feasible.

In accordance with this invention it is proposed to provide a novel high speed can printing machine which includes an endless conveyor having mandrels projecting laterally therefrom, and there being provided means for automatically positioning can bodies on the mandrels and removing printed can bodies therefrom, the machine further providing novel means for presenting the moving can bodies carried by the mandrels to a printing drum whereby the necessary printing othe can bodies can be accomplished while the movement of the can bodies remains continuous.

An object of this invention is to provide a novel relationship between an endless chain having mandrels projecting therefrom and a printing drum, the chain passing around a sprocket having the same axis of rotation as the printing drum and the mandrels carried by the chain being disposed parallel to that axis and closely adjacent the printing drum whereby as the chain passes around the sprocket, can bodies carried by the mandrels are sequentially presented to the printing drum and the necessary printing is effected.

Another object of this invention is to provide a novel printing apparatus which includes a shaft having mounted thereon for rotation therewith a sprocket, there also being mounted on the shaft for rotation a printing drum with the speed of rotation of the printing drum being different from that of the shaft, and there being entrained over a portion of the sporcket an endless chain conveyor having mandrels projecting laterally therefrom for positioning parallel to and closely adjacent to the printing surface of the printing drum, the relative movement of the surface of the printing drum with respect to the mandrels effecting the rotation of the can bodies carried by the mandrel and thus causing printing thereon by the surface of the printing drum.

Another object of this invention is to provide a printing apparatus of the type set forth above wherein each mandrel is automatically tilted with respect to the printing drum so as to be spaced from the printing drum and there is associated with each mandrel support which will automatically bring the mandrel back to a position parallel to the printing drum when a can body is carried thereby in a manner so as to assure the proper printing of the can body and at the same time assuring the spacing of the mandrel from the surface of the printing drum when no can body is positioned thereon to prevent the accidental coating of the mandrel.

Another object of this invention is to provide a novel endless chain and mandrel assembly for use as part of a high speed printing machine for can bodies, the endless chain having special links formed therein at regularly spaced intervals and the mandrels being carried by the special links for rotation, each of the special links having a bearing unit or hub in which the mandrel is rotatably journalled, and there being carried by each hub a plurality of link elements which are mounted for limited pivotal movement whereby flexing of the chain with respect to the axis of the hub may be accomplished in opposite directions.

Another object of this invention is to provide a novel high speed can printing machine which is so constructed to occupy a minimum of space and at the same time provide for the automatic loading and discharge of can bodies and the application thereto first of a printing coating and then an overcoating of varnish.

Another object of this invention is to provide a novel inking train for a printing drum which provides for the application of an even coating of ink to the printing drum, the inking train including a drum inking roll which has first aplied thereto a relatively heavy coating of ink and then a relatively light coating of ink, the light coating of ink filling in and smoothing out the first applied heavy coating of ink.

A further object of this invention is to provide a novel apparatus for automatically applying can bodies to a mandrel, the apparatus including a turret having pockets therein for receiving can bodies and there being provided a feed screw for positioning can bodies to be received by the pockets of the turret, and there being associated with each pocket of the turret a pusher which will push from the turret pocket a can body when the mandrel is in alignment with the turret pocket.

With the above and other objects in view that will hereinafter appear, the nature of the invention will be more clearly understood by reference to the following detailed description, the appended claims and the several views illustrated in the accompanying drawings:

In the drawings:

FIG. 2 is a diagrammatic perspective view of the drive mechanism of the can printing machine and is taken from the opposite sides thereof from that of FIG. 1.

FIG. 3 is a schematic view showing the function of the pusher for applying a can body to a mandrel.

FIG. 4 is a schematic view of the apparatus for bringing a can body surface into contact with the printing blanket of the printing drum.

FIG. 5 is a schematic view showing the details of the apparatus for bringing the printed can bodies into contact with the drum blanket of the varnisher.

FIG. 6 is an enlarged fragmentary perspective view showing a section of the endless conveyor chain and the general details of a mandrel carried thereby.

FIG. 7 is an enlarged fragmentary longitudinal sectional view taken along the line 7—7 of FIG. 6 and shows the specific details of the construction of the mandrel and the special link of the chain in which the mandrel is rotatably journalled.

FIG. 8 is a side elevational view of a portion of a sprocket having entrained thereover the chain of FIG. 6 and shows the relationship of the special link of the chain with respect to the sprocket.

FIG. 13 is a horizontal sectional view taken through the lower portion of the printing machine and shows specifically the details of both the printing apparatus and the varnishing apparatus.

FIG. 14 is a fragmentary longitudinal vertical sectional view taken along the line 14—14 of FIG. 13 and shows the details of the lower half of the printing machine.

FIG. 22 is a fragmentary generally elevational view taken along the line 22—22 of FIG. 14 and shows the specific details of a device for initiating the rotation of a mandrel before it presents a can body carried thereby to the blanket of the printing drum.

FIG. 23 is a fragmentary longitudinal vertical view taken along the line 23—23 of FIG. 22 and shows the manner in which the device of FIG. 22 may be adjusted.

FIG. 24 is a schematic view taken through the inking train for the printing drum and shows the relationship of the various inking rolls thereof.

FIG. 25 is a transverse vertical sectional view taken through the varnishing apparatus along the line 25—25 of FIG. 14 and shows specifically the details thereof.

Figure 1:
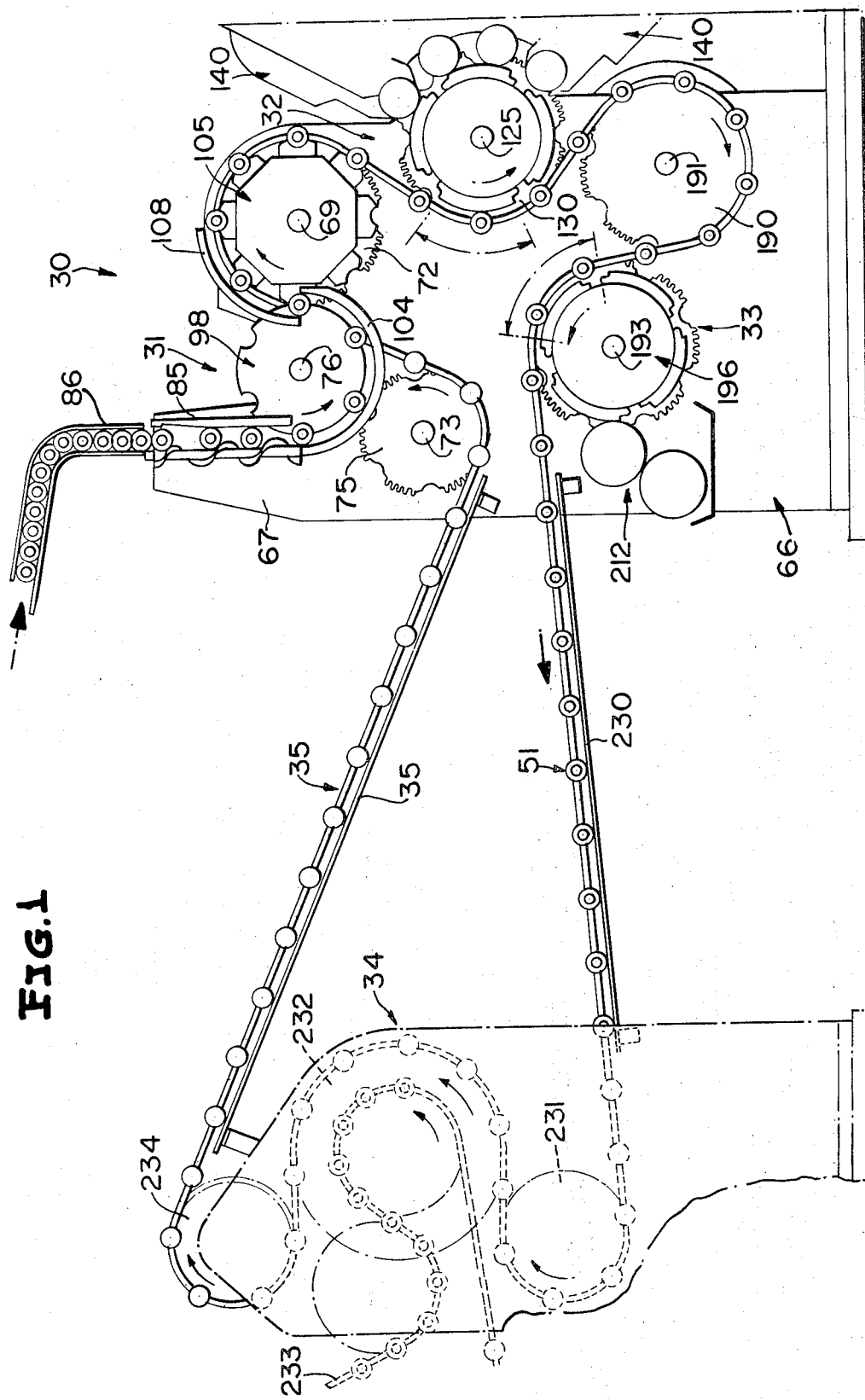
FIG. 1 is a diagrammatic side elevational view of the can printing machine and shows the relationship of the various components thereof.

Referring now to the drawings in detail, it will be seen that there are illustrated the details of the can printing machine, which is generally referred to by the numeral 30. The can printing machine 30 includes basically a can feed mechanism, which is generally referred to by the numeral 31, a printing mechanism or apparatus, which is generally referred to by the numeral 32, a varnishing apparatus, which is generally referred to by the numeral 33, and a can discharge or transfer apparatus, which is generally referred to by the numeral 34.

All of these mechanism or apparatus are connected together by an endless conveyor chain which is referred to by the numeral 35. In view of the fact that the endless conveyor chain 35 is a special chain and plays an important part in this invention, the details of the conveyor chain 35 will be set forth first.

Referring now to FIGS. 6 and 8 in particular, it will be seen that the conveyor chain 35 is for the most part of the conventional type and is of the double row type. However, at regularly spaced intervals, the conveyor chain 35 is provided with special links which are referred to by the numeral 36. It is the constructional detail of the special links 36 which make the chain 35 a special chain.

Referring now to FIG. 8 in particular, it will be seen that the special link 36 includes a hub or bearing unit which is generally referred to by the numeral 37. The hub 37 includes a sleeve 38 which has secured in the opposite ends thereof bearing sleeves 39 of the flanged type. The sleeve 38 has journalled thereon four special link elements 40, 41, 42 and 43. The link elements 40 and 43 are identical while the link elements 41 and 42 are identical. However, it is to be noted that the link elements of each pair are reversely positioned on the sleeve 38. As is clear from FIG. 6, the link element 40 has a single ear 44 projecting to the right. The link element 41 has two ears 45 and 46 projecting to the left. The link element 42 has two ears 47 and 48 projecting to the right, and the link element 43 has a single ear 49 projecting to the left. The ears 44 and 45 are in alignment, the ears 46 and 47 are in alignment and the ears 48 and 49 are in alignment and are connected to the remaining links of the chain 35 in a conventional manner.

It will be readily apparent that the link elements 40 and 42 may pivot in unison in one clockwise direction while the link elements 41 and 43 are free to pivot in the opposite clockwise direction. Thus, the chain 35 may pivot about the axis of the special link 36 in opposite directions in the same manner as it does with respect to any other link thereof.

It is to be noted that the two link elements 41 and 42 have notches in the opposite faces thereof while the link elements 40 and 43 have notches in only the inner faces thereof. The notches of the link elements are not complementary, but each notch is in excess of 180° so as to allow limited relative pivoting between the link elements to accomplish the necessary flexibility of the conveyor chain 35.

Each of the special links 36 carries a mandrel which is generally referred to by the numeral 51. Each mandrel 51 includes a shaft 52 which is hollow for a purpose not part of this invention but which is utilized in the mounting and discharging of a can body from the mandrel 51. The hollow shaft 52 is rotatably journalled in the bearing sleeve 39. A hollow mandrel body 53 is secured to the left end of the shaft 52, as is viewed in FIG. 7, by means of a pin 54. The left end portion of the mandrel body 53 has a resilient cover 55 of a size to snugly fit within a can body. It is to be noted that the left end of the cover 55 is tapered as at 56 to facilitate the positioning of a can body on the mandrel 51. It is also to be noted that the right end of the cover 55 is secured to the mandrel body 53 by means of a set screw 57.

Each shaft 52 is provided with spacers 58 and 59 at the opposite ends of the hub 37. The right end of the shaft 52 carries a conventional cam follower 60 which is secured in place on the shaft 52 by means of a nut 61.

It is to be noted that the right end portion of the mandrel body 53 is enlarged and has positioned thereon a ring 62. The ring 62 may be of any suitable wear resistant material through which the mandrel 51 may be rotated by frictional engagement therewith. The purpose of the ring 62 will be described in more detail hereinafter.

Referring now to referred to 8 in particular, it will be seen that there is illustrated a typical sprocket which for identification purposes is referred to by the numeral 63. The sprocket 63 is provided with teeth 64 arranged in two rows for normal engagement with the normal links of the chain 35. The sprocket 63 is recessed at regularly spaced intervals at 65. The recesses 65 correspond in spacing to the special links 36 and are of sufficient size to receive the hubs 37. It will be noted from FIG. 1 that although the chain 35 is provided with the enlarged links 36, due to the specific construction of the links 36, the chain 35 will flex in the opposite direction in the same manner as any other conventional type of chain.

Figure 10:
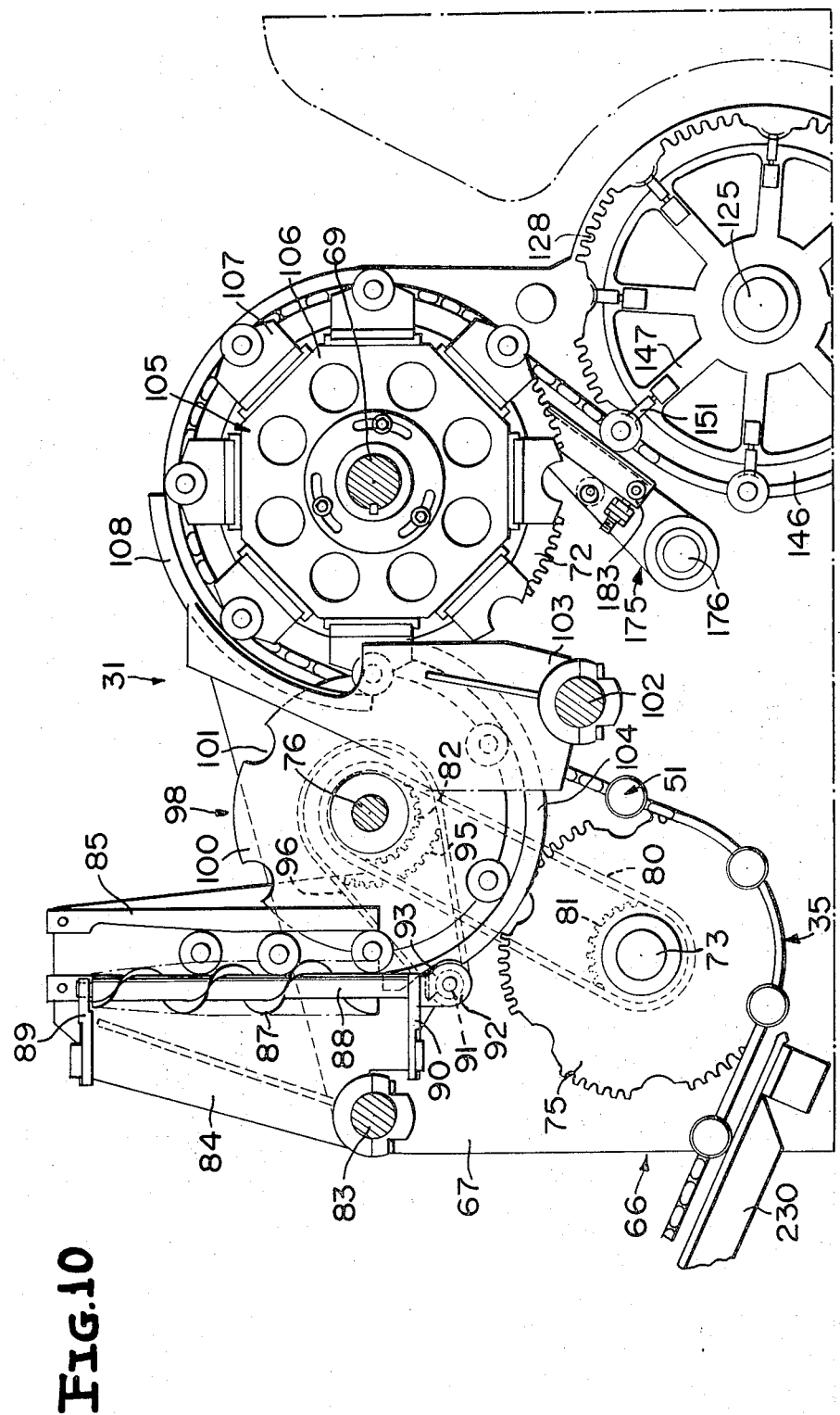
FIG. 10 is a fragmentary longitudinal vertical sectional view taken along the line 10—10 of FIG. 9 and shows specifically the details of the upper part of the can printing machine.

Referring now to FIGS. 1 and 10 in particular, it will be seen that the main portion of the can printing machine 30 is supported by a frame which is generally referred to by the numeral 66. The specific details of the frame, for the most part, form no part of this invention. However, it is to be understood that the frame 66 does include a pair of side plates 67 and 66. The can feed mechanism 31 is mounted in the upper portion of the frame 66. The can feed mechanism 31 includes a shaft 69 which extends transversely of the frame 66 and which is rotatably journalled in suitable bearings 70 and 71 carried by the side plates 67 and 68, respectively. The shaft 69 carries a sprocket 72 over which the chain 35 is entrained. The shaft 69 is thus driven by means of the chain 35.

Figure 9:
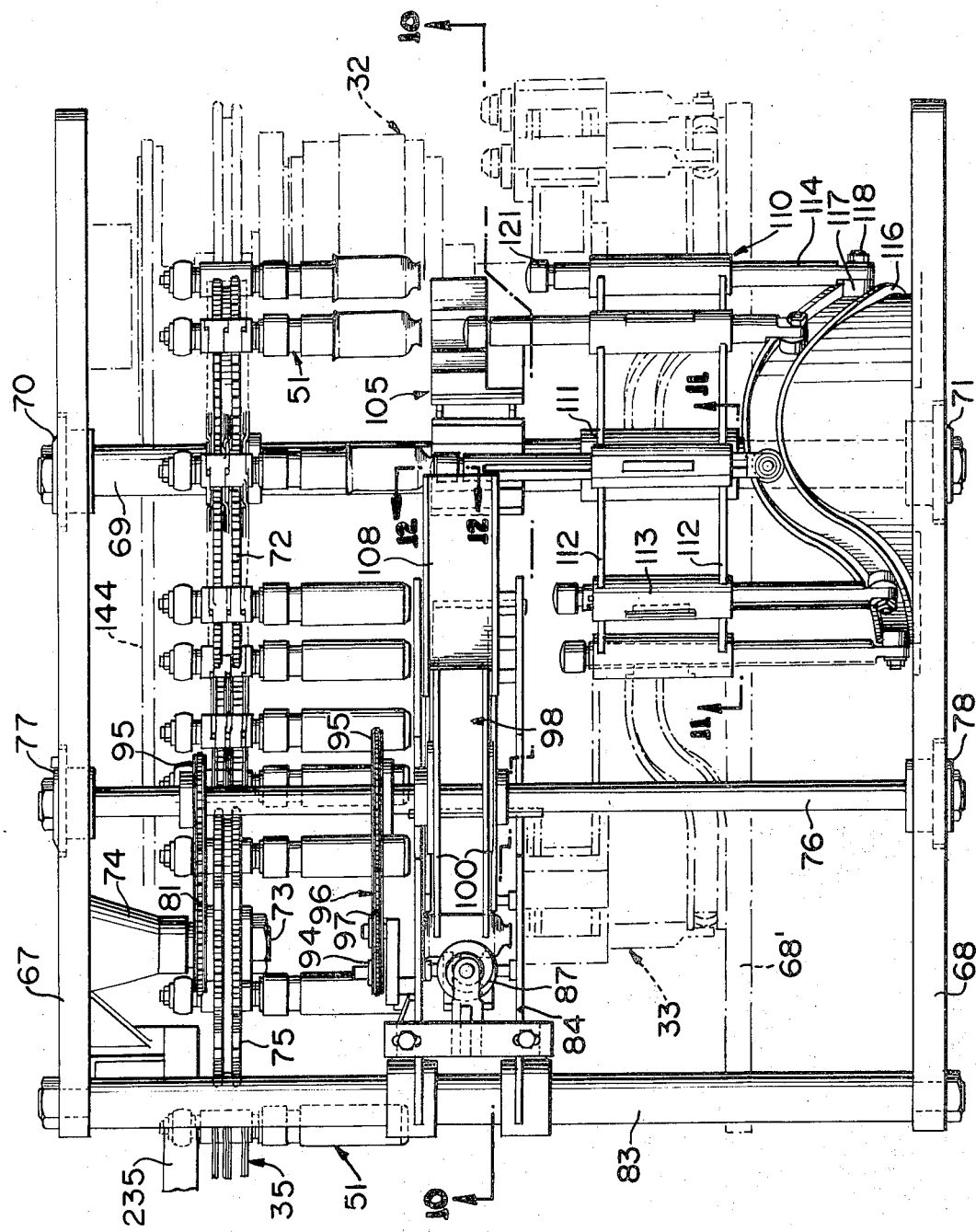
FIG. 9 is a plan view of the printing machine and shows only that portion thereof appearing at the right-hand half of FIG. 1.

The can feed mechanism 31 includes a stub shaft 73 which is carried by a housing 74 extending from the side plate 67, as is best shown in FIG. 9. The stub shaft 73 carries a sprocket 75 under which the chain 35 passes before it passes upwardly and around the sprocket 72. The sprocket 75 and the shaft 73 are driven by the chain 35.

A shaft 76 extends across the frame 68 to the left of the shaft 69. The shaft 76 has the opposite ends thereof rotatably journalled in bearings 77 and 78 carried by the side plates 67 and 68, respectively. The shaft 76 is driven from the stub shaft 73 by means of a drive chain 80. The drive chain 80 is entrained over a drive sprocket 81 carried by the stub shaft 73 and a driven sprocket 82 carried by the shaft 76.

The side plates 67 and 68 are connected together at their upper left-hand corners by means of a transverse rod 83. The rod 83 supports a bracket 84 which is positioned centrally of the frame 66, as is generally shown in FIG. 9. The bracket 84, in turn, supports a vertical guide 85 for can bodies which are horizontally disposed. The vertical guide 85 is aligned with the lower end of a chute 86 through which can bodies are delivered to the guide 85. A spiral feed screw 87 is positioned adjacent the guide 85 for effecting the movement of the can bodies through the guide 85 in a predetermined spaced relation. The feed screw 87 is carried by a shaft 88 which has its upper end suitably journalled in a bearing carried by a plate 89 and its lower end suitably journalled in a bearing carried by a plate 90. The plates 89 and 90 are carried by the bracket 84.

The bracket 84 supports a horizontal shaft 91 which is provided with a bevel gear 92 on one end thereof. The bevel gear 92 in turn, engages a bevel gear 93 secured to the lower end of the shaft 88 for effecting the rotation of the shaft 88. The opposite end of the shaft 91 is provided with a sprocket 94 which is aligned with a sprocket 95 carried by the shaft 76. A drive chain 96 is entrained over the sprockets 94 and 95 and drivingly connects the two together so that the shaft 76 is utilized in the driving of the shaft 88. If desired, an idler sprocket 97 may be provided for the purpose of adjusting the tension of the chain 96, the idler sprocket 97 being shown in FIG. 9.

The shaft 76 carries a turret which is generally referred to by the numeral 98. The turret 98 is formed of a pair of spaced plates 100 which are mounted on the shaft 76 for rotation therewith. The plates 100 have seats 101 formed therein for the reception of can bodies from the lower end of the guide 85. Inasmuch as the plates 100 are rotated in timed relation to the movement of the can bodies along the guide 85 by the feed screw 87, it will be seen that each can body has available a seat 101 therefor when it reaches the lower end of the guide 85.

The frame 66 also includes a transverse rod 102 which extends between the side plates 67 and 68 and ties together the same. There is mounted on the central portion of the rod 102 a suitable bracket structure 103 which, in turn, supports a suitable guide 104. The guide 104 is of a suitable construction for retaining the can bodies within the turret 98 as they pass about the lower portion of the travel of the turret 98.

The shaft 69 carries a turret which is generally referred to by the numeral 105. The turret 105 includes a large center hub member 106 which is polygonal in outline and which carries a plurality of can body support shoes 107 disposed in circumferentially spaced relation. It is to be noted that the support shoes 107 are spaced both circumferentially and radially in accordance with the path of movement of mandrels 51 about the axis of the shaft 69. It is also to be noted that the spacing of the supporting shoes 107 corresponds to the spacing of the pockets 101 in the turret 98. Furthermore, it is to be noted that the timing of the rotation of the turrets 105 and 98 is such that the pockets 101 are aligned with the support shoes 107 at the point of transfer between the two turrets whereby a can body may be readily transferred from the turret 98 to the turret 105.

It is to be understood that when a can body is transferred to the turret 105 from the turret 98, the can body is loosely seated in a support shoe 107 thereof. In order to prevent the accidental displacement of a can body radially outwardly of its associated support shoe 107, there is carried by the bracket 103 a further guide structure, which is referred to by the numeral 108. The guide structure 108 is suitably constructed to retain the can bodies in the support shoes 107 as they move upwardly and about the top of the turret 105, as viewed in FIG. 10.

Figure 11:
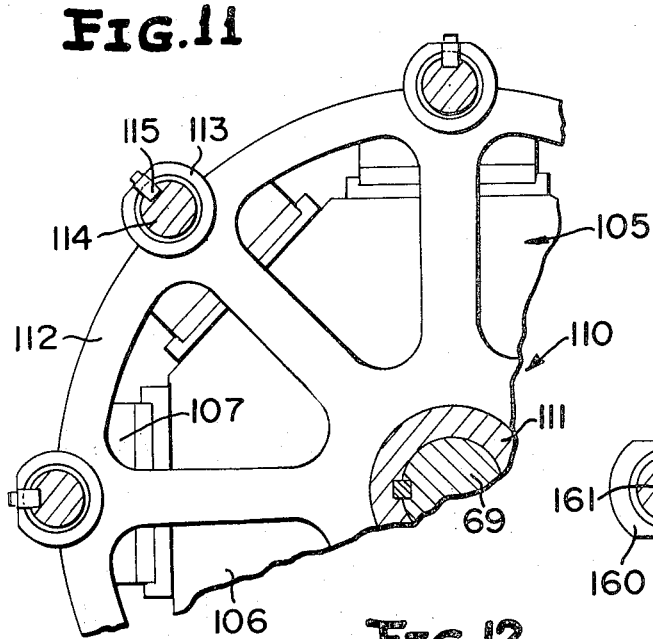
FIG. 11 is an enlarged fragmentary longitudinal sectional view taken along the line 11—11 of FIG. 9 and shows specifically the details of the carrier mounting the pushers for effecting the placing of can bodies on the mandrels.
Figure 15:
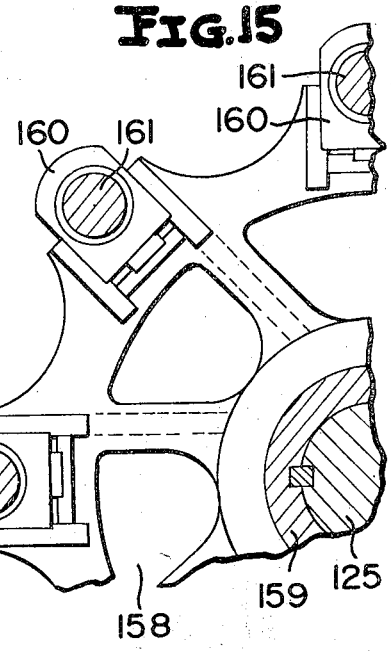
FIG. 15 is an enlarged fragmentary longitudinal sectional view taken along the line 15—15 of FIG. 13 and shows the specific details of the mounting of the supports which cooperate with the mandrels to present can bodies to the printing drum.

As is clearly shown in FIGS. 2 and 9, the shaft 69 also carries for rotation therewith a pusher unit, which is generally referred to by the numeral 110. The pusher unit 110, as is best shown in FIGS. 9 and 11, includes a hub 111 which is keyed onto the shaft 69. The hub 111 carries a pair of support wheels 112 which are spaced axially of the shaft 69. The support wheels 112, in turn, support sleeves 113 which extend parallel to the shaft 69 and which are aligned with the support shoes 107 of the turret 105. The sleeves 113 have positioned therein shafts 114 which are mounted for reciprocatory movement parallel to the shaft 69. The shafts 114 are keyed by means of keys 115 to their respective sleeves 113 so as to fix the shafts 114 against rotation.

The pusher unit 110 also includes a cam track 116 which is fixedly mounted on the side frame plate 68. The cam 116 is cylindrical in outline and is concentric about the axis of the shaft 69. The stroke of the cam 116 is longitudinally of the shaft 69.

It is to be noted that each of the shafts 114 is provided at the end thereof remote from the turret 105 with a cam follower 117. Each cam follower 117 has a mounting fastener 118 which extends generally normal to the axis of its associated shaft 114. The cam follower of each shaft 114 rides in the cam 16 and effects the reciprocation of the respective shaft 114 in timed relation to the rotation of the pusher unit 110.

Figure 12:
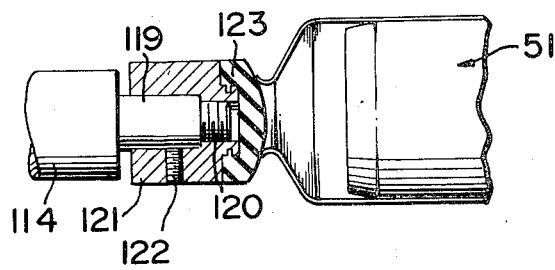
FIG. 12 is a fragmentary transverse vertical sectional view taken along the line 12—12 of FIG. 9 and shows the specific details of the head of the pusher and the relationship thereof with respect to a can body.

Referring now to FIG. 12 in particular, it will be seen that each of the shafts 114 is provided at the end thereof remote from the cam follower 117 thereof with a reduced end portion 119. The end portion portion 119 has suitably secured thereon, such as by means of a threaded connection 120, a head 121. The head 121 may be locked in place by means of a set screw 122. The head 121 has a resilient cushion 123 suitably secured on the free end thereof with the cushion 123 being particularly shaped for engaging an end of a can body and exerting an axial force thereon in a manner so as to not to damage the can body in any manner whatsoever.

It will be apparent from FIG. 9 that as a can body moves about the axis of the shaft 69 in supporting relation by means of the turret 105, it is aligned with both a mandrel 51 and one of the shafts 114. This relationship is maintained through at least 360° of the rotation of a can body about the shaft 69. As the can body rotates about shaft 69, the shaft 114 associated therewith is advanced towards the aligned mandrel 51 and first comes into engagement with the adjacent end of a can body. After the head 121 of the particular shaft 114 engages the associated end of the can body, it begins to move the can body axially out of its associated support shoe 107. The movement of the can body axially of the sahft 69 results in the can body open end freely passing over the mandrel 51 in the manner generally shown schematically in FIG. 3 and specifically in FIG. 9. The stroke of the cam 116 is such so as to effect the full seating of a can body on an associated mandrel 51. As is clearly shown in FIG. 3 diagrammatically, the shape of the cam 116 is such to provide for the automatic projection and retraction of the shafts 114 sufficient to effect the necessary transfer of can bodies from the turret 105 to the mandrels 51 in timed relation to the rotation of the shaft 69.

Figure 18:
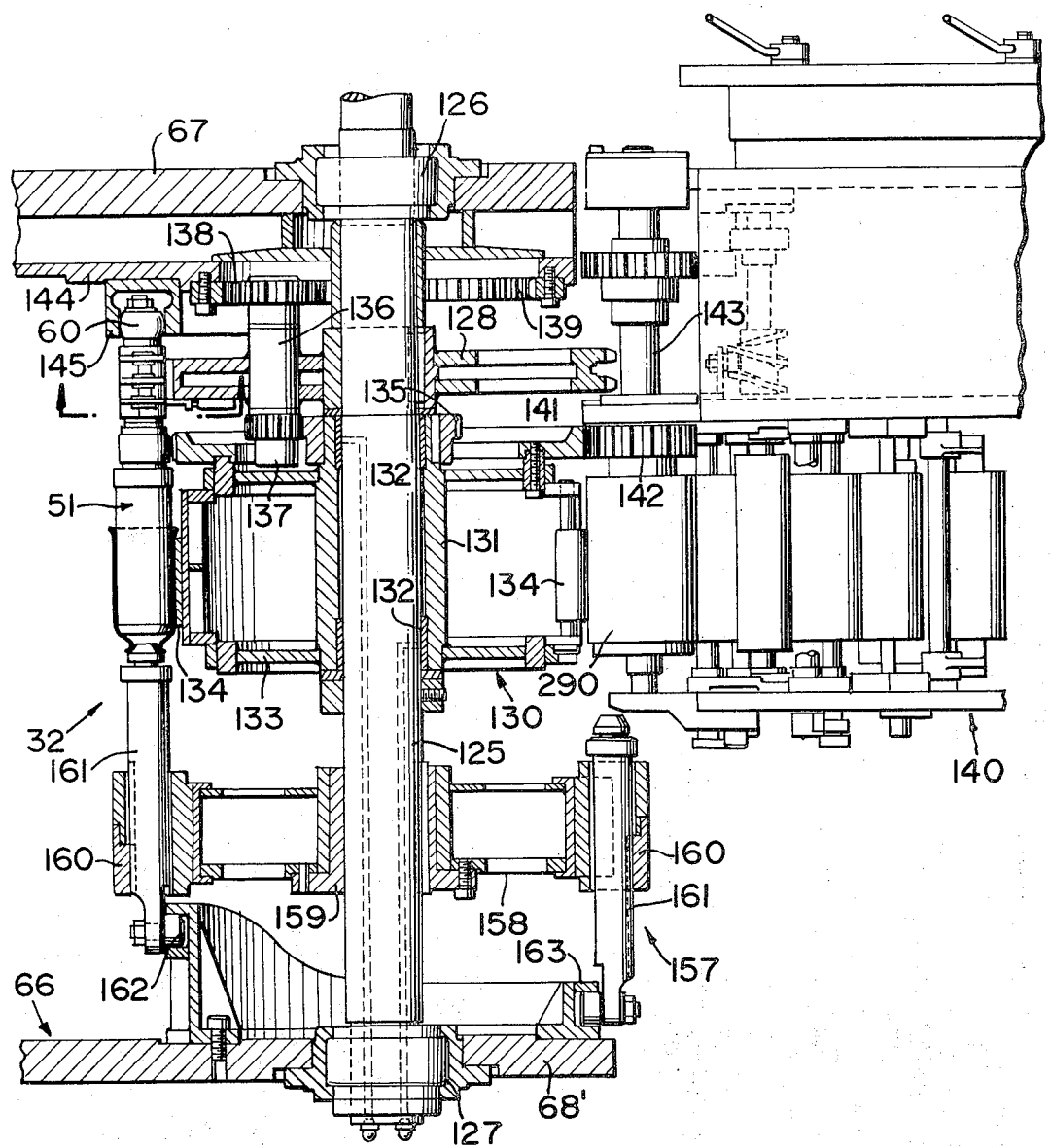
FIG. 18 is a fragmentary horizontal sectional view taken along the line 18—18 of FIG. 14 and shows more specifically the details of the printing apparatus.

After a can body has been properly positioned on a mandrel 51, it is moved towards the printing apparatus 32. As is best shown in FIG. 18, the printing apparatus 32 includes a shaft 125 which extends transversely of the frame 66 and is suitably rotatably journalled in bearings 126 and 127 carried by the side plates 67 and 68', respectively. The shaft 125 has mounted thereon for rotation therewith a sprocket 128. The sprocket 128 is disposed adjacent the side plate 67 and has entrained thereover the chain 35 with the chain passing around the sprocket in the direction best shown in FIG. 14.

A printing drum, which is generally referred to by the numeral 130 is rotatably journalled on the central portion of the shaft 125 adjacent the sprocket 128. The printing drum 130 includes a hub 131 which is supported on the shaft for rotation by means of bearings 132. A suitable support structure 133 extends outwardly from the hub 131. Inasmuch as the support structure 133 in itself plays no part in this invention, it will not be described in detail. It is to be understood, however, that the support structure 133 may be of any conventional type and is particularly adapted to support a plurality of blankets 134 which are also of a conventional construction. The blankets 134 are separately removable and the preferred embodiment of the invention has four blankets 134 which are of like construction and which are equally spaced about the periphery of the printing drum 130.

Referring once again to FIG. 18, it will be seen that the hub 131 is provided at the emd thereof adjacent the sprocket 123 with a drive gear 135 which is in the form of a sun gear of a planetary gear unit. It will also be seen that the sprocket 128 functions as a carrier and supports a plurality of bearing sleeves 136 in which there are rotatably journalled planetary shafts. At the inner end of each planetary shaft there is positioned a planetary gear 137 which is meshed with the sun gear 135. The outer end of each planetary shaft is provided with a planetary gear 138 which is in meshing engagement with an internal ring gear 139. The internal ring gear 139 is fixedly secured to a support plate 144 which is part of the frame 66 and is disposed adjacent to and generally parallel to the side plate 67.

It will be readily apparent that as the sprocket 128 rotates with the shaft 125, the planetary shafts carried by the bearing sleeves 136 will rotate about the axis of the shaft 125. As a result, the planetary gears 138 will rub on the fixed internal ring gear 139 and effect the rotation of the planetary gears 137 which, in turn, will effect the rotation of the printing drum 130 through the driving of the sun gear 135. It is to be understood that the printing drum 130 will rotate in the same direction and at a greater rate than the shaft 125.

It is preferred that the printing apparatus be of the multiple color type. Accordingly, there is associated with the printing drum 130 a plurality of inking trains 140. The inking trains 140 are described in more detail hereinafter. However, it is to be noted that the printing drum 130 carries a large drive gear 141 which is engaged with a driven gear 142 carried by a main shaft 143 of each of the inking trains 140. The shaft 143, by means of suitable gearing (not shown) drives the remainder of the inking train.

It will be readily apparent from FIG. 18 that the axial relationship of the mandrels 51 and the blankets 134 of the printing drum 130 is such that can bodies carried by the mandrels 51 are axially aligned with the blankets 134 so that printing may be effected on the exterior surfaces of the can bodies by the blankets 134.

It will be seen from FIG. 18 that the outer end of each mandrel 51 is supported at the time a can body carried thereby is presented to the blankets 134 by means of a cam track 145. The cam track 145 has received therein the cam follower 60 of each mandrel. The relationship of the cam followers 60 and the cam track 145 aids in radially positioning the mandrels 51. However, due to the rounded configuration of the outer surfcce of each cam follower 60, pivoting of the mandrels 51 away from and towards the printing drum 130 may be accomplished.

Figure 19:
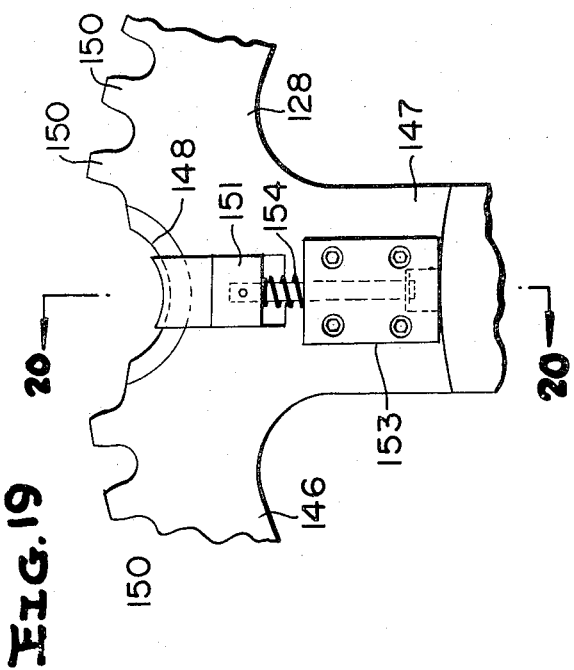
FIG. 19 is an enlarged fragmentary vertical sectional view taken along the line 19—19 of FIG. 18 and shows the specific details of the sprocket associated with the printing drum and the means carried thereby for automatically urging the mandrels away from the blanket of the printing drum.
Figure 20:
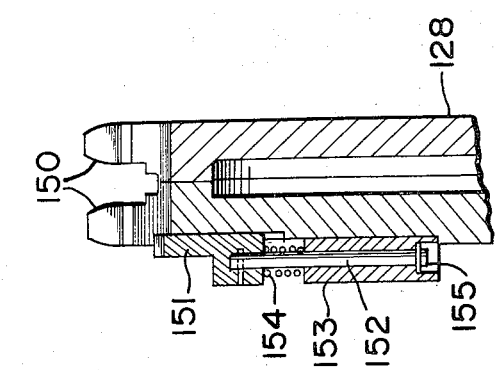
FIG. 20 is an enlarged fragmentary vertical sectional view taken along the line 20—20 of FIG. 19 and shows further the details of the mechanism for automatically urging the mandrels away from the printing drum.
Figure 21:
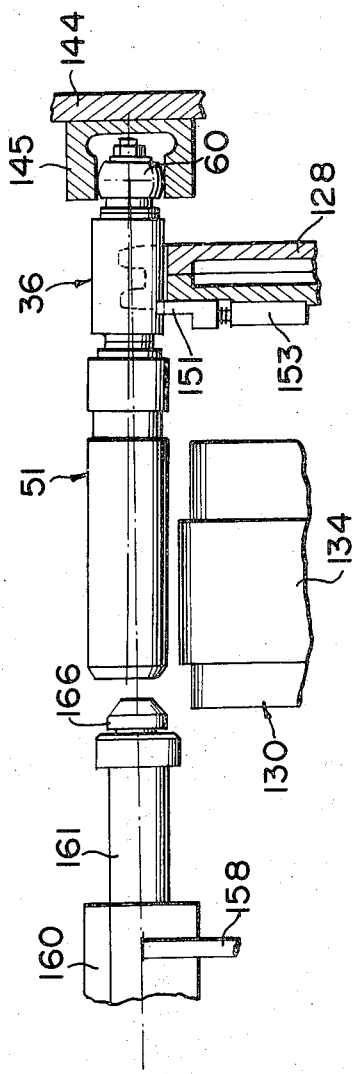
FIG. 21 is a fragmentary schematic plan view showing the manner in which a mandrel is held away from the printing drum when there is no can body positioned thereon.

Referring now to FIGS. 19, 20 and 21, it will be seen there is illustrated the details of the sprocket 128. The sprocket 128 includes a rim 146 which is supported by a plurality of spokes 147. The spokes 147 are aligned with pockets or sets 148 for the special links 36 of the chain 35. The rim 146 is provided with conventional teeth 150 adjacent the seat 148.

Each of the spokes 147 carries a camming member 151 on the inner surface thereof in alignment with the associated seat 148. The camming member 151 is carried by a rod 152 which is slidably mounted in a guide block 153 for radial movement. The camming member 151 is spring loaded radially outwardly by means of a spring 154. Outward movement of the camming member 151 is limited by a collar 155 carried by the rod 152. As is clear from FIG. 21, when one of the special links 36 is seated in an associated seat 148 of the sprocket 128, the special link 36 is engaged by the associated camming member 151 and is urged outwardly with the result that the special link 36 and the associated mandrel 51 is cocked in the director clearly shown in FIG. 21. As a result, the mandrel 51 is moved away from the path of the associated blankets 134 of the printing drum 130. This particular relationship prevents the accidental contact of the mandrel 51 with the printing blankets in the event no can body is disposed thereon, thereby preventing the undesired coating of the covering 55 with ink.

In order to facilitate the movement of the can bodies so that they will be engaged by the blankets 134, there is associated with the printing drum 130 a support assembly which is generally referred to by the numeral 157. The support assembly 157 includes a turret structure 158 which is carried by the shaft 125 for rotation therewith. The turret structure 158 includes a suitable hub 159 which is fixedly secured to the shaft 125. The turret structure 158 has supported in the outer portion thereof axially extending bearing sleeves 160. The bearing sleeves 160 have the same spacing as the pockets 148 of the sprocket 128 and are aligned therewith. In each bearing sleeve 160 there is positioned an intermediate portion of a shaft 161 which is keyed relative to the bearing sleeve 160 to prevent the rotation thereof. The outer end of each of the shafts 161 is provided with a cam follower 162 which is seated in a cam track 163. The cam track 163 is fixedly secured to the side plate 63'.

Figure 16:
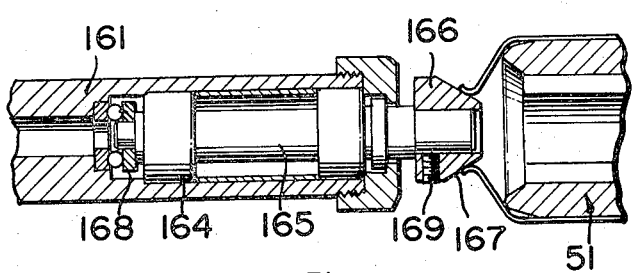
FIG. 16 is an enlarged fragmentary transverse vertical sectional view taken along the line 16—16 of FIG. 13 and shows the specific details of the head of the support and the relationship thereof to a can body carried by the mandrel.

Reference is now made to FIG. 16 wherein there is illustrated the inner end of one of the shafts 161. The inner end of each shaft 161 is of a tubular construction and a suitable bearing assembly 164 is positioned therein. In the bearing assembly there is rotatably journalled a shaft 165 which is provided at the projecting end thereof with a head 166 particularly adapted for engagement with the associated end gear 270 which is a can body carried by one of the mandrels 51. It is to be noted that the head 166 has a tapered surface 167 so as to permit the automatic alignment of the mandrel 51 with the shaft 161 as the head 166 enters into the end of the can body. A suitable thrust bearing 168 is provided at the opposite end of the shaft 165 to carry the thrust imposed upon the shaft 165 as the head 166 enters into a can body. It is to be noted that the head 166 and the associated shaft 165 is free to rotate while the shaft 161 is fixed against rotation.

Figure 17:
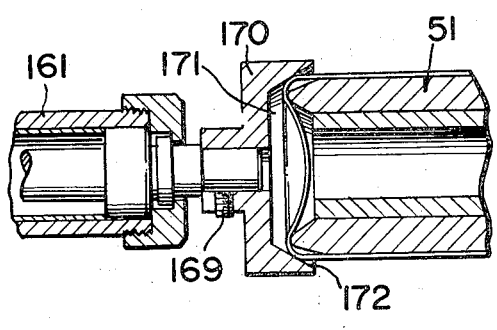
FIG. 17 is an enlarged fragmentary vertical sectional view similar to FIG. 16 and shows the support of FIG. 16 having a modified form of head for engagement with can bodies of the type having integral closed ends.

It is also to be noted that the head 166 is interchangeably mounted on the shaft 165 and is held in place by means of a set screw 169. In FIG. 17 there is illustrated a modified form of head which is referred to by the numeral 170. The head 170 has a socket type seat 171 which includes a tapered surface 172 for engaging a closed end can body on the external surface thereof. It is to be understood that the head 170 will also function to effect the alignment of a mandrel with the associated shaft 161.

Reference is now made to the schematic shown in FIG. 4. It will be seen that when a can body and mandrel 51 first start movement about the printing drum 130, the camming member 151 will retain the can body in radially spaced relation with respect to the blankets 134 of the printing drum. At the proper time, when the can body is disposed between adjacent blankets, the associated shaft 161 will move axially of the shaft of the printing drum and will come into engagement with the can body carried by the mandrel. The co-action of the head 166 of the shaft 161 and the can body will result in the radial movement of the can body and mandrel towards the center of the printing drum 130 with the result that the can body will come into position for contact with the overtaking blanket 134. Inasmuch as the printing drum 130 is turning faster than the can body is being conveyed, although the can body and the printing drum are both moving about the axis of the printing drum in a counterclockwise direction, the can body will be rotated about its axis by its engagement with the printing drum blanket 134. It is to be understood that the relative movement of the blanket 134 qith respect to the can body will be such that a complete rotation of the can body will be effected while it is in contact with the printing drum. After the complete revolution of the can body has been effected and the can body has passed off of the blanket, the shaft 161 will be withdrawn to permit the can body to pass on to the next station.

It will be readily apparent that it is preferred that the mandrels 51 be rotating as the can bodies carried thereby come into engagement with the blankets of the printing drum. As a result, there is positioned adjacent the path of the mandrels 51 as they approach the printing drum 130 an accelerator ramp structure which is generally referred to by the numeral 175. The accelerator ramp structure 175 is carried by a support rod 176 which extends inwardly from the side plate 67, as is shown in FIG. 22. A collar 177 is mounted on the rod 176 and carries a support arm 178. The support arm 178 is adjustable about the rod 176 by means of a shaft 179 which has one end thereof rotatably journalled in the plate 67 as at 180. The opposite end of the shaft 179 is in the form of an eccentric 181 which is journalled within the arm 178. The shaft 179 is provided with an enlarged head 182 to facilitate the rotation thereof to adjust the arm 178.

The arm 178 carries an accelerator ramp 183 which has one end thereof pivotally connected to the arm 178 by means of a pivot shaft 184. The opposite end of the accelerator ramp 183 is adjustably mounted and is carried by a rod 184 having a head 185 which is secured to the accelerator ramp 183. The rod 184 passes through a block 186 carried by the arm 178 and is retained in an adjusted position by means of lock nuts 187. It is to be understood that the accelerator ramp 183 is positioned for contact by ring members 62 of mandrels 51 to automatically effect the rotation of the mandrels as they pass along the accelerator ramp 183.

After the chain 35 passes around the sprocket 128 of the printing apparatus 32, it passes in a clockwise direction around and below a sprocket 190 which is carried by a stub shaft 191. The mounting of the stub shaft 191 and the details of the sprocket 190 play no part in this invention, and therefore, will not be more specifically described hereinafter.

The chain 35 next passes around a sprocket 192 of the varnishing apparatus 33 to effect the application of a varnish overcoat to the previously printed can bodies.

Referring now to FIG. 25 in particular, it will be seen that the varnishing apparatus 33 includes a shaft 193 which extends between the side plates 67 and 68' and is rotatably journalled in bearings 194 and 195 carried by the side plates 67 and 68', respectively. The sprocket 192 is fixedly secured to the shaft 193 and is utilized for the purpose of driving the shaft 193 in addition to the presentation of can bodies to the varnishing apparatus 33 in timed sequence. The varnishing apparatus 33 includes a varnishing drum, generally referred to by the numeral 196. The varnishing drum 196 is of the same general construction as the printing drum 130 and will not be described in more detail here except to state that it does include a hub 197 which is rotatably journalled on the sbaft 193 and has replaceable blankets 198 which correspond to the blankets 134.

The varnishing drum 196 is driven by a planetary gear unit from the sprocket 192 in the same manner as is the printing drum 130.

It will be seen that the varnishing drum 196 has attached thereto a sun gear 200 which is driven by planetary gears 201 which are carried by planetary shafts rotatably journalled in bearing sleeves 202 fixedly secured to the sprocket 192 functioning as a carrier. The planetary shafts have planetary gears 204 on the opposite ends thereof which are meshed with an internal ring gear 205 carried by the plate 144 of the frame 66. Further description of the manner in which the varnishing drum 196 is driven at a speed gerater than the shaft 193 is believed to be unnecessary.

It is to be understood that the sprocket 192 is of the same construction as the sprocket 128 so that the mandrels 51 are normally urged away from the blankets 198 of the varnishing drum 198. Furthermore, the mandrels are positioned radially by means of a cam track 206 which has engaged therein the cam follower 60. In addition, there is associated with the varnishing drum a support unit which is generally referred to by the numeral 207 and which corresponds to the support unit 157 associated with the printing drum 130. Like the suport unit 157, the support unit 207 has a cam track 208 for effecting the timed reciprocation of pusher shafts 161 carried thereby. Inasmuch as the structural details of the support unit 207 and the function thereof is substantially the same as that of the support unit 157, the structural details thereof will be identified by the same reference numerals and further description will not be made.

Referring now to FIG. 5 in particular, it will be seen that there is illustrated diagrammatically the outline of the cam track 208. It will be seen that the cam track 208 is so shaped so as to effect the engagement of can bodies when the can bodies are between the blankets 198 of the varnishing drum 196 and holds them in the proper relative position with respect to the blankets 198 to effect a complet varnishing overcoat.

It is to be understood that the can bodies are rotated by the blankets 198 of the varnishing drum 196. It is however, desired that the can bodies be rotated prior to the time they are presented to the blankets 198. Accordingly, an accelerator ramp structure 210 is positioned adjacent the path of the can bodies as they pass from the sprocket 190 to the varnishing drum 196. The accelerator ramp structure 210 is carried by a support rod 211 and is otherwise identical with the accelerator ramp structure 175. Accordingly, no further description of the details thereof will be made here, and like parts will be referred to by like reference numerals.

Referring now to FIGS. 14 and 25, it will be seen that there will be illustrated the details of a varnish supply train which is generally referred to by the numeral 212. The varnish supply train 212 includes a suitable supply pan 213 which is adjustably mounted by means of adjustable supports 214 which will not be described in detail. A pickup roll 215 rotates within the pan 213 and transfers varnish to a roll 216 which, in turn, transfers varnish to the blankets 198 of the varnishing drum 196. It is to be understood that the rolls 215 and 216 are supported by a suitable support structure 217 which also supports the pan 213.

The drive for the rolls 215 and 216 is accomplished by means of a drive chain 218 which is entrained about a sprocket 220 carried by the shaft 193 adjacent the plate 144. The drive chain 218 passes around a driven sprocket 221 which is carried by a stub shaft 222 which is suitably supported by a bearing assembly 223 which, in turn, is carried by the side plate 67. If desired, an idler tensioning sprocket 224 may be provided for the chain 218.

The stub shaft 222 also carries a gear 225 which is meshed with an intermediate gear 226 which is suitably supported from the support unit 217. The gear 226, in turn, drives a gear 227 which is attached to the roll 215. The gear 227 meshes with a gear 228 secured to the roll 216 to effect the driving of the roll 216.

Referring once again to FIG. 1 in particular, it will be seen that after the can bodies pass around the varnishing apparatus 33, they pass onto the can discharge or transfer apparatus 34. Inasmuch as the run of the chain 35 between the varnishing apparatus 33 and the transfer apparatus 34 is relatively long, a support ramp 230 is provided. The support ramp 230 underlies and engages the cam follower 60.

The transfer apparatus 34 includes a sprocket 231 about which the chain 35 passes in a clockwise direction. The chain 35 then passes about a sprocket 232 in a counterclockwise direction and while passing around the sprocket 232, the can bodies are transferred from the chain 35 to a chain 233, the purpose of which will not be described hereinafter. The chain 35 then passes around a sprocket 234 of the transfer apparatus 34. The chain 35 then has a long straight run to the previously mentioned sprocket 75. The chain is supported along this long run by means of a support ramp 235 which underlies the cam followers 260. The sprocket 231 is resiliently urged to the left by a suitable means not illustrated so as to maintain the chain 35 under constant tension.

Referring now to FIG. 2, it will be seen that there is illustrated the drive train for the can printing machine 30. The drive train is generally referred to by the numeral 236 and includes a motor and reduction gear unit 237 of a conventional type. The unit 237 has an output shaft 238 which is connected by means of a coupling 239 to an input shaft 240 of a T-drive unit 241. The T-drive unit 241 includes a first output shaft 242 which forms a continuation of the input shaft 240. The output shaft 242 is coupled by means of a coupling 243 to a drive shaft 244. The opposite end of the drive shaft 244 is connected by means of a coupling 245 to an input shaft 246 of a right angle drive unit 247. The output end of the right angle drive unit carries a sprocket 248 which is aligned with a sprocket 249 which is mounted on a common shaft 250 with one of the sprockets for the take-away conveyor 233. A drive chain 251 is entrained over the sprockets 248 and 249 to effect the driving of the take-away chain 233. A suitable slack takeup sprocket 252 is provided.

The shaft 125 which carries the printing apparatus 32 has a reduced terminal portion 253 on which there is mounted for rotation a pair of sprockets 254 and 255, the sprockets 254 and 255 being disposed in spaced relation axially of the shaft portion 253. The sprocket 255 is aligned with a sprocket 256 which is carried by the outer output shaft of the T-drive unit 241. A drive chain 257 is entrained over the sprockets 255 and 256 and the sprocket 255 is constantly driven when the unit 237 is operating.

A second combined motor and gear unit 258 is provided for driving the sprocket 254. The unit 253 is provided with an output shaft 260 whch carries a sprocket 261 but is aligned with the sprocket 254. A drive chain 262 is entrained over the sprockets 261 and 254.

The shaft portion 253 carries a clutch 263 between the sprockets 255 and 254. The clutch 263 is of the dog clutch type and is engageable to drive the shaft 125 from the sprockets 254 and 255 in only one position thereof. In this manner the synchronism between the chain 35 and the chain 233 is never lost.

The clutch 263 is suitably keyed to the shaft portion 253 for sliding movement and is movable by means of a clutch lever 264 which is shifted by means of a shaft 265 which extends transversely of the machine 30. The shaft 265 is positioned by means of a lever 266.

It is to be understood that in a neutral position of the lever 266, the clutch 263 is disengaged and the unit 237 functions to drive the chain 233 while the machine 30 is otherwise inoperative. When the clutch 263 is shifted to engage the sprocket 255, the shaft 29 is driven from the T-gear box 241 at a predetermined rate so that the machine 30 operates in timed unison with the movement of the chain 233. On the other hand, there are times when it is desirable to run the machine 30 at a relatively low speed, such as for testing. It is at this that the unit 253 is utilized to drive the shaft 125 at a much slower speed. This is accomplished by shifting the clutch 263 so as to interconnect the sprocket 254 with the terminal portion 253 of the shaft 125.

It is a feature of the invention to drive the shaft 125 which mounts the printing apparatus 32 and have the chain 35 driven by the same shaft rather than to drive the chain 35 from a different shaft and have the chain 35 drive the shaft 125 and printing apparatus 32. The reason for this preference is that the chain 35 is long and at high speed may surge slightly. Such surging if transmitted to the printing apparatus 32 would result in poor registration and smearing of the printed matter.

Means are also provided for hand turning the shaft 125. These means are generally referred to by the numeral 267 and includes a gear 268 fixed on the shaft 125 remote from the clutch 263. The gear 268 is drivable by means of a gear 269 which is selectively shiftable axially of the shaft 69 into and out of engagement with the gear 268. The gear 269 is movable as a unit with a gear 270 which is mounted on a common shaft 271 with the gear 269. The gear 270 is driven by means of a gear 272 which is mounted on a common shaft 273 with a hand wheel 274. It is to be noted that the hand wheel 274, the shaft 273 and the gear 272 are axially shiftable as a unit and that the gear 269 moves in unison therewith to effect the engagement or disengagement of the hand drive means 267.

Referring now to FIG. 24 in particular, there will be seen that there is illustrated the details of the inking train 140. The inking train 140 includes a fountain 280 with which there is periodically engaged a ductor roll 281 which is mounted for oscillatory movement on a suitable support 232. An oscillating roll 283 has ink transferred thereto from the fountain 280 by the ductor roll 281. The oscillating roll 283 then transfers the ink to a transfer roll 284.

The transfer roll 284, rotating in a counterclockwise direction, first engages an oscillator roll 285 and transfers a major portion of the ink coating carried thereby to the oscillator roll 285. The major portion of the remaining ink on the transfer roll 284 is then transferred to an oscillator roll 286. The oscillator roll 285 contacts a form roll 287 and transfers the ink carried thereby to the form roll 287. In a similar manner, the oscillator roll 286 transfers the small amount of ink carried thereby to a form roll 288.

A plate is mounted for rotation in contact with the form rolls 287 and 288. The plate, which is referred to by the numeral 290, is mounted for clockwise rotation and first engages the form roll 287 to receive the large quantity of ink carried thereby. It then engages the form roll 288 to receive the smaller quantity of ink carried thereby. It will be seen that inasmuch as the smaller quantity of ink is transferred to the plate 290 over the larger quantity of ink, this latterly applied ink will smooth out and fill in the voids in the first applied ink so that the plate 290 has applied thereto a smooth coating of ink. The plate 290 then transfers the ink carried thereby to the blanket 134 in the desired pattern.

The ductor roll 281, the intermediate roll 234 and the form rollers 287 and 288 are all formed of a resilient material, such as rubber or rubber like products. The other rollers are formed of metal. This arrangement of the rolls facilitates the desired transfer of ink from one roll to another.

It has been pointed out above that there are a plurality of the inking trains 140. There will be one inking train 140 for each color to be printed. It is to be understood that any desired number of the inking trains 140 may be utilized.

It will be readily apparent from FIG. 1 that the high speed can printing machine 30 may operate on a continuous basis. As the can bodies are constantly delivered to the machine 30 down the chute 86, they are received by the feed apparatus 31 and positioned on the mandrels 51 carroed by the chain 35. The can bodies are then presented to the printing apparatus 32 where the desired coating is applied thereto. This coating may be an over-all coating of multiple colors or may be only a partial coating with the metal of the can body presenting the background. After the initial coating of the can body by printing, it is presented to the varnishing apparatus 33 and an over-all coat of varnish is applied thereto. The can body is then presented to the transfer apparatus 34 and is transferred to the chain 233 which may carry the can body into a suitable drying oven or other mechanism.

Although only a preferred embodiment of the invention has been specifically illustrated and described herein, it is to be understood that minor variations may be made therein within the spirit and scope of the invention, as defined by the appended claims.

I claim:

1. An apparatus for performing an operation on a thin wall tubular member comprising a working member, a conveyor having a first support thereon particularly adapted for supporting a thin wall tubular member in telescoped relation and presenting the tubular member to said working member, means for resiliently urging said first support away from said working member to prevent engagement of said working member by said first support in the absence of a tubular member, and a second support opposing said first support and movable therewith, said second support having a tapered support surface for engaging the tubular member, and aligning said first support with said second support and overcoming the urging of said first support.

2. An apparatus for externally coating a can body comprising a coating drum rotatable about an axis, an endless conveyor mounted for movement in part about said axis, a mandrel carried by said conveyor in cantilever relation for movement concentric to and closely adjacent to said drum, and a support mounted for movement about said axis in opposed relation to said mandrel, said support having an end axially spaced from said mandrel in all positions thereof and configurated for interlocking engagement with an end of a can body to aid said mandrel in supporting a can body, means for resiliently twisting said conveyor to urge said mandrel slightly away from said drum in the absence of a can body, and said configurated support end being tapered for automatically shifting said mandrel to a position parallel to said axis when a can body is carried by said mandrel.

3. The apparatus of claim 2 wherein said conveyor passes around a sprocket mounted for rotation about said axis, and said means for resiliently twisting said conveyor being carried by said sprocket.

* * * * *